US008428156B2

United States Patent
Xu et al.

(10) Patent No.: US 8,428,156 B2
(45) Date of Patent: Apr. 23, 2013

(54) RATE CONTROL FOR MULTI-CHANNEL COMMUNICATION SYSTEMS

(75) Inventors: Hao Xu, San Diego, CA (US); Byoung-Hoon Kim, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1207 days.

(21) Appl. No.: 11/688,235

(22) Filed: Mar. 19, 2007

(65) Prior Publication Data

US 2007/0242766 A1 Oct. 18, 2007

Related U.S. Application Data

(60) Provisional application No. 60/784,586, filed on Mar. 20, 2006.

(51) Int. Cl.
*H04K 1/10* (2006.01)
*H04L 27/28* (2006.01)

(52) U.S. Cl.
USPC .......................................................... 375/260

(58) Field of Classification Search .................... 375/260
See application file for complete search history.

(56) References Cited

U.S. PATENT DOCUMENTS

| 6,917,821 B2 | 7/2005 | Kadous et al. | |
| 2004/0082356 A1 | 4/2004 | Walton et al. | |
| 2004/0120411 A1* | 6/2004 | Walton et al. | 375/260 |
| 2005/0018784 A1 | 1/2005 | Kurobe et al. | |
| 2005/0170802 A1 | 8/2005 | Oh et al. | |
| 2006/0040674 A1* | 2/2006 | Vannithamby et al. | 455/452.2 |
| 2006/0194602 A1* | 8/2006 | Rudrapatna | 455/522 |
| 2007/0198719 A1* | 8/2007 | Su et al. | 709/226 |

FOREIGN PATENT DOCUMENTS

| CN | 1256030 A | 6/2000 |
| CN | 1697362 A | 11/2005 |
| CN | 1717888 | 1/2006 |
| CN | L200380102101 | 6/2011 |

(Continued)

OTHER PUBLICATIONS

Buehrer R M ED—Institute of Electrical and Electronics Engineers: "On the Usefulness of Outer-Loop Power Control with Successive Interference Cancellation," IEEE 56th. Vehicular Technology Conference Proceedings. Vancouver, Canada, Sep. 24-28, 2002, IEEE Vehicular Technology Conference; New York, NY: IEEE, US, pp. 1897-1901;XP010608759, ISBN:0/7803-7467-3.

(Continued)

*Primary Examiner* — David C. Payne
*Assistant Examiner* — Tanmay Shah
(74) *Attorney, Agent, or Firm* — Kenyon S. Jenckes

(57) ABSTRACT

Various methods and systems for determining reverse-link data rates in a multi-user communication system are disclosed. For example, an apparatus for controlling a data rate of at least a first UE in a multi-user communication system is disclosed. The apparatus may include a channel estimation device configured to determine channel estimates for a plurality of different reverse-link signals to produce a plurality of channel estimates, a demodulation device configured to determine a first signal-to-noise (SNR) ratio for the first UE using the plurality of different channels estimates, and a data rate determining device configured to determine a first reverse-link data rate for the first UE using the first SNR.

38 Claims, 4 Drawing Sheets

FOREIGN PATENT DOCUMENTS

| | | |
|---|---|---|
| JP | 2005223913 A | 8/2005 |
| JP | 2006504339 A | 2/2006 |
| JP | 2006504372 | 2/2006 |
| RU | 2262212 | 10/2005 |
| RU | 2263406 | 10/2005 |
| WO | WO9834356 A1 | 8/1998 |
| WO | WO2004038984 | 5/2004 |
| WO | WO2004038986 | 5/2004 |

OTHER PUBLICATIONS

International Search Report-PCT/US07/064337, International Search Authority-European Search Report, Aug. 30, 2007.

Taiwanese Search report—096109610—TIPO—Mar. 12, 2010.

Written Opinion—PCT/US07/064337, International Searching Authority—European Patent Office, Aug. 30, 2007.

* cited by examiner

US 8,428,156 B2

RATE CONTROL FOR MULTI-CHANNEL COMMUNICATION SYSTEMS

This Application claims priority to U.S. Provisional Application No. 60/784,586 entitled "RATE CONTROL FOR MULTI-CHANNNEL COMMUNICATION SYSTEMS" filed on Mar. 20, 2006, the content of which are incorporated herein by reference in its entirety.

BACKGROUND

I. Field

This disclosure relates to wireless communication. More particularly, this disclosure relates to methods and systems for determining reverse-link data rates and scheduling in a multi-user wireless network.

II. Background

An orthogonal frequency division multiplex (OFDM) communication system effectively partitions an overall system bandwidth into multiple ($N_F$) sub-carriers, which may also be referred to as frequency sub-channels, tones, or frequency bins. For an OFDM system, the data to be transmitted (i.e., the information bits) may be first encoded with a particular coding scheme to generate coded bits, and the coded bits can be further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency sub-carrier, a modulation symbol may be transmitted on each of the $N_F$ frequency sub-carrier. OFDM may be used to combat inter-symbol interference (ISI) caused by frequency selective fading, which is characterized by different amounts of attenuation across the system bandwidth.

A multiple-input multiple-output (MIMO) communication system can employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may be referred to as a "spatial subchannel" of the MIMO channel and corresponds to a dimension. The MIMO system may likely provide improved performance (e.g., increased transmission capacity) if the additional dimensionalities created by the multiple transmit and receive antennas are utilized.

For a MIMO system that employs OFDM (i.e., a MIMO-OFDM system), $N_F$ frequency sub-carrier are available on each of the $N_S$ spatial sub-channels for data transmission. Each frequency sub-carrier of each spatial sub-channel may be referred to as a transmission channel. Thus, $N_F \cdot N_S$ transmission channels are available for data transmission between the $N_T$ transmit antennas and $N_R$ receive antennas.

For a MIMO-OFDM systems the $N_F$ frequency sub-channels of each spatial sub-channel may experience different channel conditions (e.g., different fading and multi-path effects), and may achieve different signal-to-noise-and-interference ratios (SNRs). Each transmitted modulated symbol may be affected by the response of the transmission channel on which the symbol was transmitted. Depending on the multi-path profile of the communication channel between the transmitter and receiver, the frequency response may vary wisely throughout the system bandwidth for each spatial sub-channel, and may further vary widely among the spatial sub-channels.

For a multi-path channel with a frequency response that is not flat, the information rate (i.e., the number of information bits per modulation symbol) that may be reliably transmitted on each transmission channel may be different from transmission channel to transmission channel. If the modulation symbols for a particular data packet are transmitted over multiple transmission channels, and if the response of these transmission channels varies widely, then these modulation symbols may be received with a wide range of SNRs. The SNR would then vary correspondingly across the entire received packet, which may then make it difficult to determine the proper rate for the data packet.

Since different transmitters and receivers may experience different (and possibly widely varying) channel conditions, it may be impractical to transmit data at the same transmit power and/or data rate to all receivers. Fixing these transmission parameters would likely result in a waste of transmit power, the use of sub-optimal data rates, and/or unreliable communication for various receivers, all of which leads to an undesirable decrease in system capacity.

The above discussion describes various problems with rate determination for reverse-link scheduling of any users. Unfortunately, in the case of MIMO communication systems, further difficulties arise with the simultaneous transmission of multiple streams from multiple antennas of multiple users.

Still further, the channel conditions may vary over time due to a wide variety of reasons. As a results the supported data rates for the transmission channels may also vary over time. Thus, the different transmission capabilities of the communication channels for different receivers, plus the multi-path and time-variant nature of these communication channels, and larger degrees of freedom in assigning different power and rates from different transmit antennas make it challenging to efficiently transmit data in a MIMO system.

SUMMARY

Various aspects and embodiments of the invention are described in further detail below.

In an embodiment, an apparatus for controlling a data rate of at least a first UE in a multi-user communication system includes a channel estimation device configured to determine channel estimates for a plurality of different reverse-link signals to produce a plurality of channel estimates, a demodulation device configured to determine a first signal-to-noise (SNR) ratio for the first UE using the plurality of different channels estimates, and a data rate determining device configured to determine a first reverse-link data rate for the first UE using the first SNR.

In another embodiment, an apparatus for controlling a data rate of at least a first UE in a multi-user communication system includes a processing circuit coupled to a memory. The processing circuit is configured to determine a channel estimate for a plurality of different reverse-link signals to produce a plurality of channel estimates, determine a first signal-to-noise (SNR) ratio for the first UE using the plurality of different channels estimates, and determine a first reverse-link data rate using the first SNR.

In still another embodiment, an apparatus for controlling a data rate of at least a first UE in a multi-user communication system includes a channel estimation means for determining a channel estimate for a plurality of different reverse-link signals to produce a plurality of channel estimates, a demodulation means for determining a first signal-to-noise (SNR) ratio for the first UE using, the plurality of different channels estimates, and a determining means for determining a first reverse-link data rate using the first SNR.

In yet another embodiment, a method for controlling a data rate of at least a first UE in a multi-user communication system includes determining a channel estimate for a plurality of different reverse-link signals to produce a plurality of channel estimates, determining a first signal-to-noise (SNR) ratio for the first UE using the plurality of different channels estimates, and determining determine a first reverse-link data rate using the first SNR.

In still yet another embodiment, an apparatus for scheduling data rates for a plurality of UEs includes a means for power controlling respective reference signals from the UEs, and a means for determining a reverse-link data rate for the respective UEs using the pilot signal.

In still another embodiment, a computer-readable memory device contains a plurality of computer-based instructions. The computer-based memory includes first code for determining a channel estimate for a plurality of different reverse-link signals to produce a plurality of channel estimates, second code for determining a first signal-to-noise (SNR) ratio for the first UE using the plurality of different channels estimates, and third code for determining a first reverse-link data rate using the first SNR.

BRIEF DESCRIPTION OF THE DRAWINGS

The features and nature of the present disclosure will become more apparent from the detailed description set forth below when taken in conjunction with the drawings in which like reference characters identify correspondingly throughout, and wherein.

DETAILED DESCRIIPTION

As discussed above, different transmitters and receivers may experience different (and possibly widely varying) channel conditions, and thus it may be impractical to transmit data at the same transmit power and/or data rate to all receivers. Since fixing these transmission parameters would likely lead to an undesirable decrease in system capacity, it can be advantageous to determine the optimal transmission power levels and data rates for each transmitter when possible.

While the following discussion is directed to an MIMO-OFDM communication system by way of example, it should be appreciated to those skilled in the relevant arts that the following discussion may also apply to SIMO-OFDM, single-carrier FDM (SC-FDM), CDMA, SDMA, and other communication standards as will be discussed below.

Figure 1:
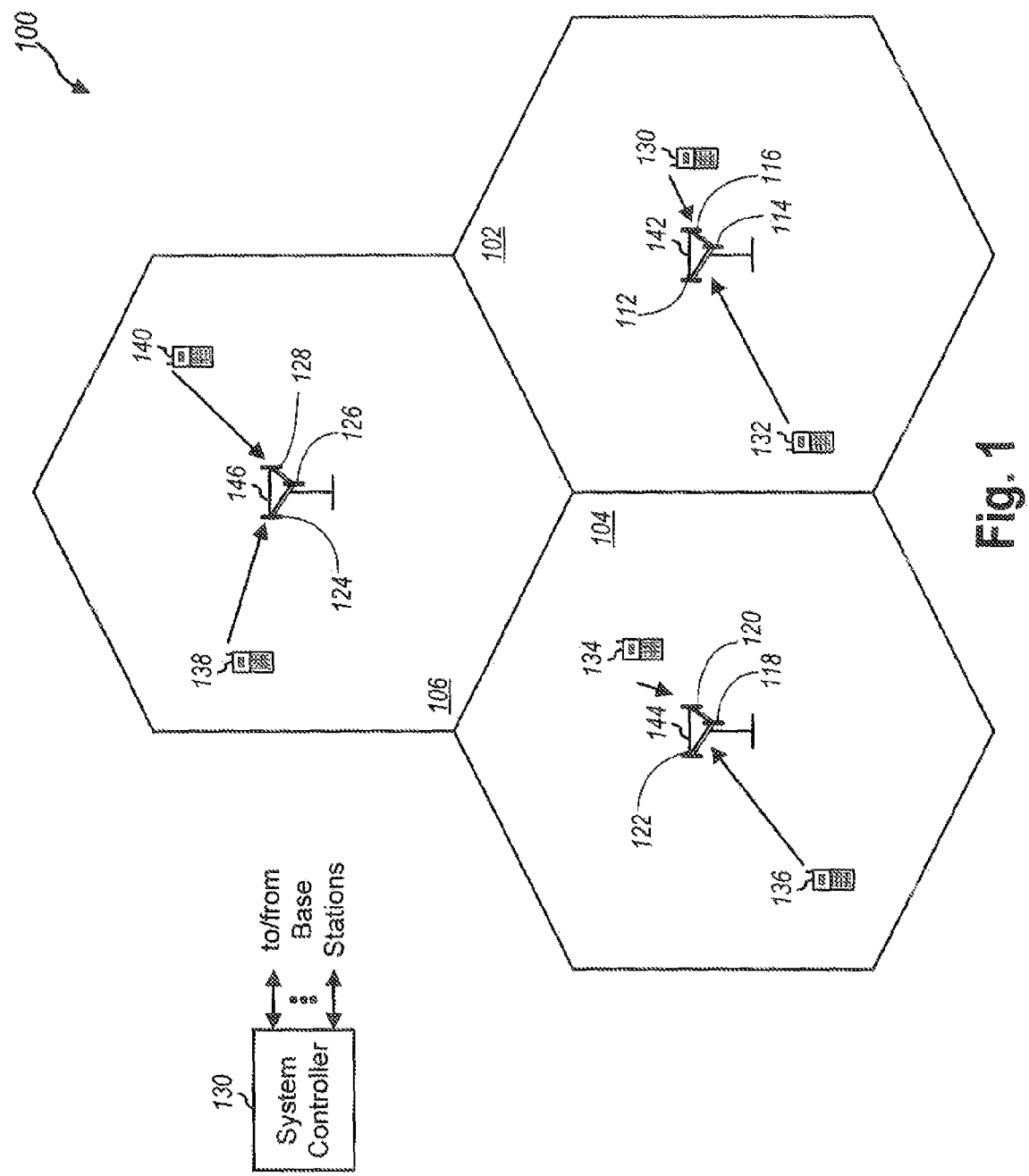
FIG. 1 depicts an exemplary multiple access wireless communication systems.

Referring to FIG. 1, an exemplary multiple access wireless communication system 100 according to one aspect is illustrated. As shown in FIG. 1, the multiple access wireless communication system 100 includes multiple cells 102, 104 and 106. In the aspect of FIG. 1, each cell 102, 104, and 106 may include a Node B 150 that includes multiple sectors. The multiple sectors may be formed by groups of antennas with each antenna group responsible for communication with UEs in a portion of the cell. In cell 102, antenna groups 112, 114, and 116 each correspond to a different sector. In cell 104 antenna groups 118, 120, and 122 each correspond to a different sector. In cell 106 antenna groups 124, 126, and 128 each correspond to a different sector.

Note that each exemplary cell 102, 104 and 106 may include several UEs which are in communication with one or more sectors of each Node B. For example, UE 130 and UE 132 are in communication Node B 142, UE 134 and UE 136 are in communication with Node B 144, and UE 138 and UE 140 are in communication with Node B 146.

As used herein, transmissions from a Node B to a UE are referred to as "forward-link", while transmissions from a UE to a Node B are referred to as "reverse-link."

In operation, several UEs may be in MIMO communication where multiple antennas in an antenna group communicate with multiple antennas of a UE. Multiple information streams may be transmitted between the Node B and UE in that mode. Other UEs may be communicating such that multiple streams are transmitted between each antenna group and multiple UEs. In such instances, the streams may be altered by several techniques to address users in different spatial locations, without interfering with the other UEs. One such approach of this type is referred to Space Division Multiple Access (SDMA)

Continuing, various MIMO schemes that allow multiple users to transmit over a given bandwidth and time resource can be regarded as an SDMA scheme. A more complex form of SDMA can use a form of transmit precoding so that the users who are simultaneous scheduled over the same bandwidth and time resource experience low inter-stream interferences at their individual receivers. A third type of SDMA is to use a densely-spaced transmit antenna array which can generate multiple beams that geographically divide a sector into multiple sub-sectors. Note that UEs in sub-sectors that are spatially far apart can be simultaneously scheduled without causing a high interference with one other. Other types of SDMA may also be utilized.

During operation, each UE may be assigned a transmission/reverse-link rate and reception/forward-link rate, either by the UE or by a related Node B. In general, users in SDMA or multi-user (MU) MIMO mode are assigned different rates, potentially using different algorithms, than users in single user SIMO mode.

A different reverse-link multiple antenna mode is single user MIMO (SU-MIMO), where multiple streams are transmitted from multiple antennas from the same UE. Further, SU-MIMO UEs may be viewed as a special case of MU-MIMO UEs. For users with high enough geometry, SU-MIMO can provide high peak rate. Further, the capacity of SU-MIMO also scales linearly with the minimum number of transmit and receive antennas, thus fully utilize the resources in the system.

One of the design challenges associate with UL-MIMO schemes is rate determination. In a SIMO system, a Node B knows exactly how much rate should be assigned to each UE based on its reference power level (i.e., the power of a pilot signal generated by the UE that is sensed by the Node B if a pilot signal is used as a reference signal), power amplifier (PA) headroom, and the loading of other cells. In other words, the data rate available to a UE has a one-to-one mapping with the power spectrum density (PSD) ratio of the UE's transmission stream to the UE's reference signal. This PSD ratio is herein referred to as a transmit-stream-to-reference-signal ("TS/RS") ratio. Note that an example of a TS/RS includes a T2P ratio, which may be used to denote a traffic-to-pilot power ratio for a SC-FDM, CDMA or SDMA reverse-link.

Unfortunately, in MU-MIMO-based or SU-MIMO-based operations, the Node B can not determine the optimal transmission rates that can be supported by each UE based on a simple TS/RS to rate mapping. In fact, a direct mapping would likely lead to overestimates of the assigned data rates. This, in turn, may result in suboptimal scheduling operation. Therefore, improved approaches to reverse-link transmission are desirable.

Figure 2:
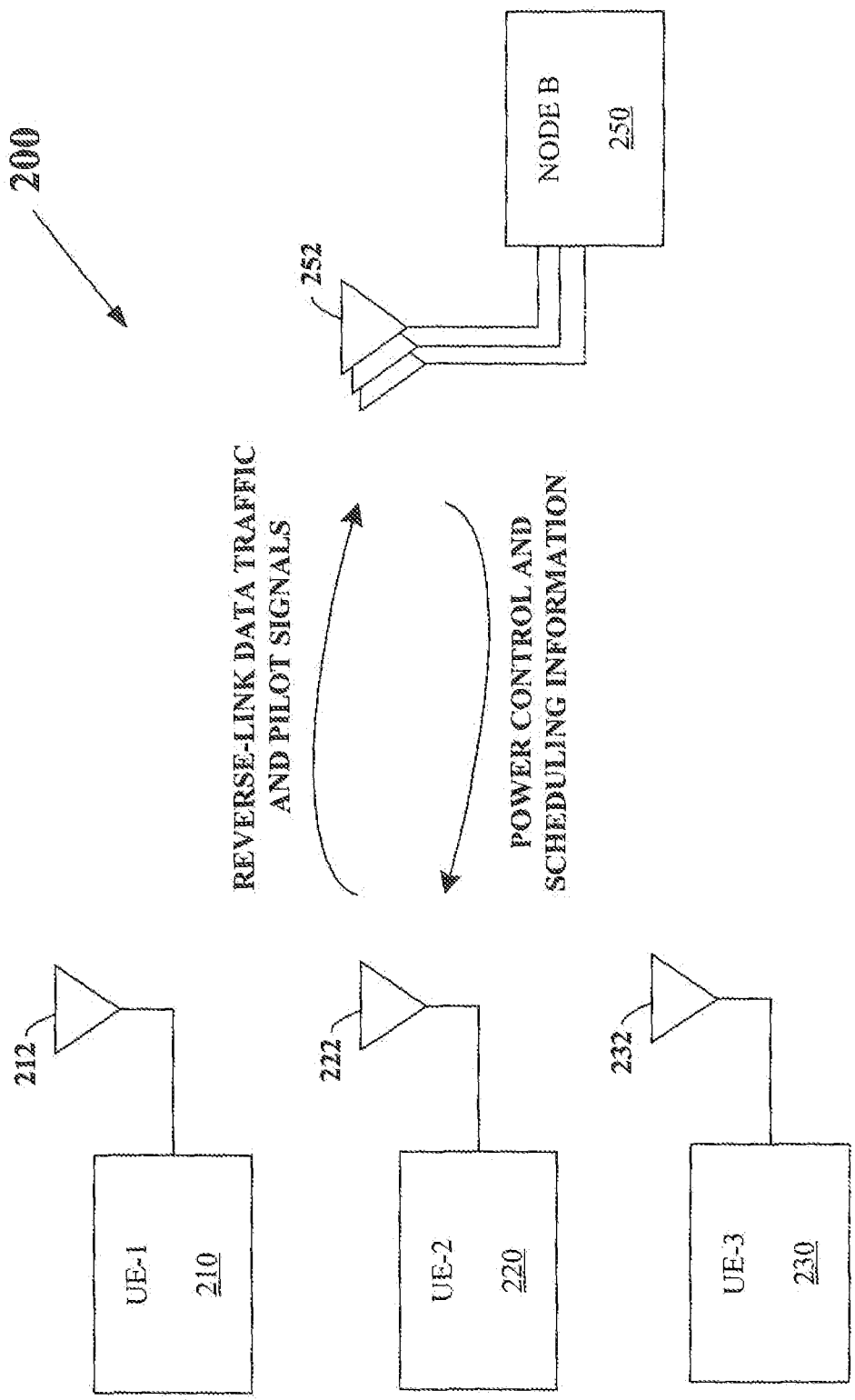
FIG. 2 depicts an exemplary transmission system.

FIG. 2 depicts a simplified OFDM wireless communication system 200. As shown in FIG. 2, the communication system includes a first UE 210 having a first antenna 212, a second UE 220 having a second antenna 222, a third UE 230 having a third antenna 232, and a Node B 250 having a base antenna array 252. While the various UE antennas 212, 222 and 232 are depicted as single devices, it should be appreciated that each UE 210, 220 and 230 may incorporate any number of antennas as may be desired.

As the communication system 200 is OFDM based, the traffic data may be transmitted on a number of separate frequency sub-carriers (e.g., 128 frequencies) while the pilot signal may be provided on every Nth (e.g., 6th) sub-carrier. However, the particular number and configuration of traffic and pilot carriers is not particularly critical to the disclosed methods and systems, and thus may vary greatly in different embodiments.

In operation, each UE 210, 220 and 230 can broadcast traffic and pilot signals to the Node B 250. In turn, the Node B can provide control information to each UE 210, 220 and 230 to control the power level of the traffic and pilot signals of each UE 210, 220 and 230, as well as provide scheduling information to enable a given UE 210, 220 and 230 to transmit at certain times. The pilot signal may be sent continuously in each symbol period. It will be appreciated that the pilot signals alternatively may be time division multiplexed (TDM), SC-FDM, OFDM, CDMA, and so on. The pilot signal can be used as a reference signal for reverse-link power control. In certain embodiments, the reference signal may be provided by some other channels, such as CQI channel. In such a case, the reference signal may include forward-link channel information, e.g. a CQI report generated by the UE.

The Node B 250 can receive and convert the streams of transmitted wireless data and pilot/reference signals from the UEs 210, 220 and 230 into analog signals, which may be monitored for power levels or any other indicator of channel quality. In turn, the analog signals may be used to generate power control and scheduling commands for the UEs 210, 220 and 230. Note that in various embodiments a pilot/reference signal may be transmitted and/or power-controlled from only one antenna of each UE.

For a UE with a single antenna communicating with the Node B 250 (which has multiple antennas), the reference/pilot signal (either pilot or a control signal such as CQI channel) may be closed-loop power controlled to the desired level to provide a reference for traffic channel power control. Generally, reverse-link traffic transmissions may be power controlled to the maximum allowed power spectral density (PSD) while maintaining a tolerable inter-cell interference level. The traffic channel PSD can be specified as a "ΔP" while the reference/pilot power level can be specified as "P0." Thus, the TS/RS of this configuration may be signified as "ΔP/P0."

Thus, once the PSD is determined, the data rate can be selected according to the traffic channel SNR. Accordingly, in this case there is a one-to-one mapping between the traffic channel PSD and the data rate.

On the other hand, for reverse-link MIMO operations, the traffic channel PSD and scheduled rate maybe decoupled. The rate selection in a system that assigns UEs to SU-MIMO or SDMA operation may be closely related to reference signal and power control, but still have some essential difference from those of SIMO operation. In certain aspects, the factors that are utilized for rate control include, but are not limited to: (1) the power of the reference/pilot signal transmitted from the UE, which is usually power controlled; (2) power control for the UE; (3) layer, i.e., the number of spatial streams being transmitted; (4) type of the receiver used at the Node B; and (5) different channels from any transmit-receive antenna pair.

Note that for MIMO operations, there may be multiple choices for the reference/pilot signal including: (A) from one antenna, (B) from all antennas simultaneously, or (C) from alternating antennas. Although over the long term, the channel statistical properties should be the same for different antennas, the realizations of the various available channels can be quite different due to fading. In addition, for instances where both external and internal antennas are made available (e.g., for a typical mobile device), antenna gains can be substantially different for the different antennas.

One solution can be to provide a power controlled reference signal, such as a channel quality information signal, using only the UE's primary antenna. One can then obtain the channel differences through the special design of a request channel, or through a more general broadband pilot design. This way, a given Node B can derive equivalent reference signal levels from all transmit antennas of the UE, yet maintain a relatively small overhead.

Once the reference/pilot power levels are determined, the delta PSD for a traffic channel can be determined based on loading on neighboring sectors, power amplifier headroom, path differential between serving cell and other cells, etc. Note that there may be differences in the determination of PSD for SU-MIMO and MU-MIMO. If multiple streams are transmitted from the same UE, then the total power of all streams should satisfy certain requirements that reflect the total PA headroom for that UE.

On the other hand, if all streams are transmitted from different UEs, then its PSD should satisfy that UE's PA headroom.

For sub-band scheduling, where users are scheduled on subsets of the entire number of sub-carriers, the users may be first grouped into various sub-bands based on a broadband pilot (e.g. pilot, or some other signaling channels such as request channel REQCH or CQICH). Within each sub-band, a device/scheduler can choose the users/layers to maximize the spatial separation while maintaining other QOS requirements. The spatial separation can be based on the channel estimates from either the broadband pilot or by a special request channel design.

Continuing, the received signal Y(k) for each UE antenna can be described by Eq. (1) below:

$$Y(k) = \sum_{i=1}^{N_s} H_i(k) X_i(k) \sqrt{P_i} + N(k) \quad (1)$$

where k is the index of a frequency tone in the selected sub-band, $P_i$ is the transmitted power from the i-th stream and $H_i$ is the vector frequency response of the channel for $N_r$ antennas of the Node B. In some aspects, $H_i(k)$ may be obtained from a broadband pilot or from a request channel. The transmitted power $P_i$ may be determined from the reference signal level and ΔP in a scheduled sub-band.

The following notation will be utilized:
(i) $N_u$=number of scheduled users;
(ii) $N_s$=number of scheduled streams from these Nu users;
(iii) $N_r$=number of receive antennas at the Node B; and
(iv) $N_t$=number of the transmit antennas at the UE.

Figure 3:
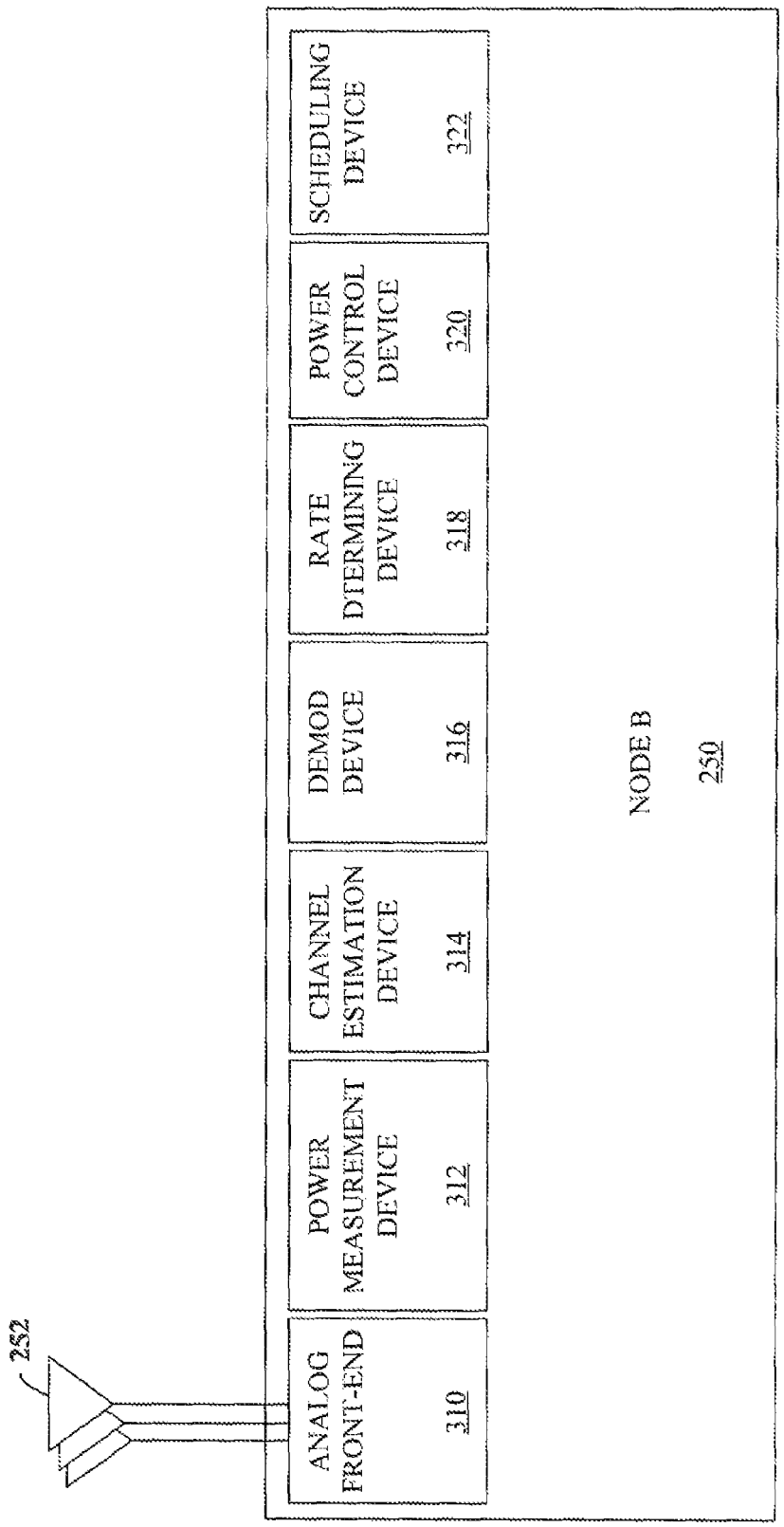
FIG. 3 shows details of the Node B of FIG. 2.

Continuing to FIG. 3, details of the Node B 250 of FIG. 2 are depicted. As shown in FIG. 3, the Node B 250 includes an analog front-end 310, a power measurement device 312, a channel estimation device 314, a demodulation ("demod")

device 316, a rate determining device 318, a power control device 320 and a scheduling device 322.

While details of the architecture of the Node B 250 are not shown, it should be appreciated that any known or later-developed architecture may be used as is well known to those of ordinary skill in the art.

For example, in various embodiments, the various components 310-322 can take the form of separate electronic components coupled together via a single or a series of separate busses. Still further, in other embodiments, one or more of the various components 310-322 can take form of processors or even separate servers coupled together via one or more networks. Additionally, it should be appreciated that each of components 310-322 advantageously can be realized using multiple computing devices employed in a cooperative fashion.

It also should be appreciated that some of the above-listed components 310-322 can take the form of software/firmware structures and routines residing in a memory to be executed or worked upon by a controller, or even software/firmware routines or structures residing in separate memories in separate servers/computers being operated upon by different controllers.

In operation as streams of data traffic and pilot signals are received by the antenna array 252, the analog front-end 310 can accept the received streams, condition the streams and provide the conditioned streams to the power measurement device 312.

In turn, the power measurement device 312 may make various power measurements and determinations for each channel based on the data traffic and pilot signals provided by a UE. In various OFDM-based embodiments, the power measurement device 312 may measure each OFDM sub-carrier, determine the overall received power of each of the reverse-link channel signal, measure the pilot/reference sub-carriers, determine the PSD of the reverse-link channel signals, and determine of the ΔP/P0 for each channel.

In various embodiments the Node B may provide the PSD and ΔP/P0 determinations to the respective UEs using forward-link communication whereupon the various UEs may each determine and send information regarding a desired PSD that the UE desires (i.e., has made a determination that it would be advantageous) to use.

Next, the estimation device 314 may estimate the transmission channel for each OFDM sub-carrier of each reverse-link stream.

Once the various channel estimates H(k) are determined, the demodulation device 316 can determine the SNR of each OFDM sub-carrier.

In situations where the demodulation device 316 employs a minimum-means-square-error (MMSE) algorithm, MMSE weights for the $j^{th}$ OFDM stream may be given by Eq. (2):

$$w_j(k) = \sqrt{P_j}\, H_i^H(k) \left\{ \sum_{i=1}^{N_s} H_i(k) H_i^H(k) P_i + R_{nn} \right\}^{-1} \quad (2)$$

Continuing, assuming that the channel estimates H(k) are made available by the channel estimation device 314, the demodulation device 316 may calculate the SNR for each frequency/sub-carrier according to Eq. (3) below:

$$SNR_j(k) = P_j H_i^H(k) \left\{ \sum_{\substack{i=1 \\ i \neq j}}^{N_s} H_i(k) H_i^H(k) P_i + R_{nn} \right\}^{-1} H_j(k) \quad (3)$$

Using the SNRs are provided by the demodulation device 316, an appropriate data rate may be then determined by the rate determining device 318 (typically by using a look-up table) while taking into account other considerations, such as a UE's PA overhead, the UE's existing or desired PSD, other sources of interference and so on.

As discussed above, a prominent problem with conventional data rate estimation approaches is the direct mapping between the data rate and the TS/RS ratio. This is true for SIMO transmission, but the rates are no longer valid for reverse link MIMO operations. The present approach alleviates this problem as the data rates produced by the rate determining device 318 are far better coupled to an SNR even in instances of reverse-link MIMO is complicated by simultaneous transmission of multiple reverse-link streams from different antennas. The exact rates are determined based on the knowledge of the receiver data processing architecture (such as MMSE or MMSE-SIC receiver).

Returning to FIG. 3, in embodiments where the demodulation device 316 a MMSE successive interference cancellation (MMSE-SIC) algorithm, the order of cancellation should be determined. One solution is to sort the reverse-link sub-carriers according to the total received power (see Eq. (4) below) of each UE antenna, which as discussed above may be calculated by the power measurement device 312.

$$P_i^t = \sum_k |H_i(k)|^2 P_i \quad (4)$$

For MMSE-SIC operations, it may be desirable to sort the UE's in a descending order of power, such that the strongest signals are canceled first. Note, however, that the particular MMSE-SIC ordering scheme can vary from embodiment to embodiment.

For MMSE-SIC-base receiver processing, the SNR for each stream after cancellation may be calculated by the demodulation device 316 using Eq. (5) below:

$$SNR_j(k) = P_j H_i^H(k) \left\{ \sum_{i=j+1}^{N_s} H_i(k) H_i^H(k) P_i + R_{nn} \right\}^{-1} H_j(k) \quad (5)$$

which assumes perfect cancellation of interfering streams and white noise.

The supported data rate for the $j^{th}$ user/stream can be then calculated by the rate determining device 318 based on the effective SNR, which may essentially the geometric mean from the SNR at different tones.

If perfect cancellation is assumed, then the last decoded user (the one with the lowest signal strength/PSD) does not suffer interference from all previously decoded UEs. It's data rate will in fact follow the same one-to-one mapping in the SIMO case. That is, the data rate for the last decoded UE may be determined as a function of the UE's transmit power, which can typically be controlled by a Node B. On the other hand, the early decoded users will have a data rate reduction due to the interference from the other streams.

It should be noted that such perfect cancellation may not always be assumed, and that other approaches accounting for more PA headroom should be provided.

Returning to FIG. 3, once the various SNRs and data rates for the various UEs is determined, the power control device 318 can assign an appropriate transmit power to the UEs, and the Node B 250 may provide such information to the respective UEs via a forward-link communication.

Additionally, the scheduling device 322, using the information provided by the rate determining device 318, as well as the ΔP/P0 information derived by the channel estimation device 312, can schedule the various UEs to transmit at the appropriate frequencies and time slots that may likely optimize overall reverse-link transmission of the UEs.

For the descriptions above concerning the demodulation device 316, it should be appreciated that there is no requirement that the SNR calculations of the present methods and systems be associated with any form of ongoing data demodulation. However, as SNR determination is traditionally accomplished in demodulators, for the present description the term "demodulation device" (and its derivatives) shall apply to any device capable of performing SNR determination regardless of whether or not its calculations are also used for other purposes.

Figure 4:
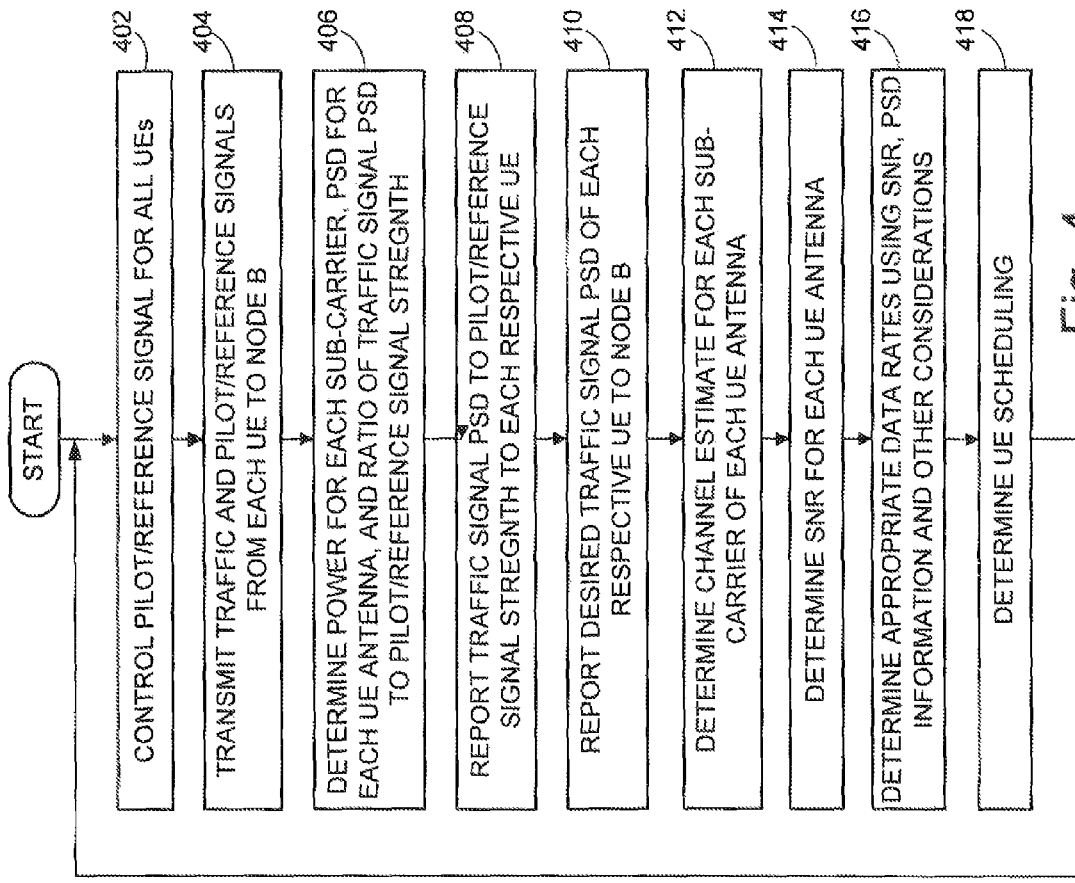
FIG. 4 is a flowchart outlining an exemplary operation of the disclosed methods and systems.

FIG. 4 is a flowchart outlining and exemplary process for determining reverse-link data rates in a multi-user communication system. While the steps of FIG. 4 are depicted in a particular order, it should be appreciated that various steps may vary in order from embodiment to embodiment, undergo alterations or possibly be eliminated in part as may be apparent to those skilled in the art.

The process starts in step 402 where a Node B can send control signals in forward-link so as to control the power levels of those UEs in communication with the Node B. In various embodiments, such control may extend to data traffic and pilot/reference signals transmitted by each UE. Next, in step 404, the various UEs can send their respective data traffic streams and pilot/reference signals to the Node B using the power levels provided in step 402 As discussed above, a pilot/reference signal may carry CQI information, other forward-link communication information, status information regarding the respective UE, and so on. Control continues to step 406.

In step 406, various power measurements and determinations may be made for each channel based on the data traffic and pilot signal of step 404 including power measurement of each OFDM sub-carrier determination of overall received power of each of the reverse-link channel signal, measurement of the pilot/reference sub-carriers, determination of the PSD of the reverse-link channel signals, and determination of the ΔP/P0 for each channel. Next, in step 408, the PSD and ΔP/P0 determinations of step 406 may be provided to, the respective UEs using forward-link communications. Then, in step 410, one or more of the various UEs may each determine and send information regarding a desired PSD that the UE desires to use. Control continues to step 412.

In step 412 a channel estimate for each reverse-link sub-carrier of each reverse-link stream may be determined. Next, in step 414, the SNR for each reverse-link sub-carrier may be determined using Eq. (3) above (for MMSE detection) or Eq. (5) (for MMSE-SIC). As discussed above, the MIMO receiver processing may be accomplished using any number of approaches, including MMSE detection and MMSE-SIC detection. When MMSE-SIC is used, an order of cancellation may be determined using reverse-link signal strength per sub-carrier or using overall channel power as determined by Eq. (4), or otherwise determined using any number of known or later-developed approaches. Control continues to step 416.

In step 416, an appropriate data rate for each UE may be determined based on the SNR values of step 410, as well as by using other criteria typically used in a like process, such as PA overhead of a UE, the PSD of a channel measured, a desired PSD of a UE, inter-cell interference, and so on. Note that for OFDM systems, data rate determination may involve determining viable data rates for different frequency sub-bands, determining data rates for different antennas of a single UE, and determining data rates for different UEs. Control continues to step 418.

In step 418, the Node B can determine a reverse-link schedule for the various UEs based on the data rates of step 412, QoS of the UEs, PSDs and other pertinent information. Accordingly, the reverse-link traffic from the UEs may be optimized. Control jumps back to step 402 where the process may repeat as needed.

As mentioned above, while the discussion above is directed to an MIMO-OFDM communication system by way of example, it should be appreciated to those skilled in the relevant arts that the following discussion may also apply to SIMO-OFDM, single-carrier FDM (SC-FDM), CDMA, SDMA, and various other known and later developed communication standards. For communication standards where the PSD and ΔP/P0 of a reverse-link stream do not apply, these quantities may need to be replaced with signal power and target-to-pilot (T2P) ratio, respectfully.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPs), programmable logic devices (PLDs), field programmable gate arrays (FPGAs), processors, controllers micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for controlling a data rate of at least a first User Equipment (UE) in a multi-user communication system, the apparatus comprising:
a channel estimation device configured to determine channel estimates for a plurality of different reverse-link signals to produce a plurality of channel estimates;

a demodulation device configured to determine a first signal-to-noise ratio (SNR) for the first UE using the plurality of channel estimates, and a data rate determining device configured to determine a first reverse-link data rate for the first UE using the first SNR based on a traffic channel power spectral density (PSD) to pilot power ratio (ΔP/P0) of each reverse link channel, wherein the ΔP is based on a power amplifier headroom or a path differential between a serving cell and other cells.

2. The apparatus of claim 1, further comprising a scheduling device for scheduling reverse-link communication with the first UE using the first reverse-link data rate.

3. The apparatus of claim 1, wherein the first UE and apparatus communicate in at least one of an OFDM, a CDMA, an SC-FDM, and a SDMA protocol.

4. The apparatus of claim 3, wherein the first UE and apparatus communicate in the reverse-link using an OFDM protocol.

5. The apparatus of claim 4, wherein the first UE and apparatus communicate in the reverse-link in a MIMO-OFDM system.

6. The apparatus of claim 4, wherein:
at least two of the plurality of different reverse-link signals used to produce a plurality of channel estimates originated from two antennas of the first UE;
the demodulation device determines the first SNR for the first of the two antennas and determines a second SNR for the second SNR for the second of the two antennas; and the data rate determining device determines the first reverse-link data rate for the first antenna of the first UE using the first SNR.

7. The apparatus of claim 1, wherein the first UE and apparatus communicate in the reverse-link using an OFDM protocol.

8. The apparatus of claim 7, wherein the channel estimation device is configured to determine a channel estimate for each sub-carrier of each OFDM reverse-link stream.

9. The apparatus of claim 8, wherein the demodulation device is further configured to determine SNRs using each channel estimate of each sub-carrier.

10. The apparatus of claim 9, wherein the demodulation device uses a minimum mean square error (MMSE) technique for determining SNRs.

11. The apparatus of claim 9, wherein the device uses a minimum mean square error-successive interference cancellation (MMSE-SIC) technique for determining SNRs.

12. The apparatus of claim 11, wherein the demodulation device uses reverse-link signal at least one of a power and PSD measurement to determine a cancellation order for the MMSE-SIC technique.

13. The apparatus of claim 12, further comprising a power measurement device configured to calculate a power spectral density (PSD) of each reverse-link channel to produce a plurality of PSD determinations.

14. The apparatus of claim 13, wherein the scheduling device uses the PSD determinations to schedule one or more UE reverse-link transmissions.

15. The apparatus of claim 1, wherein a plurality of second UEs each receive a respective reverse-link ΔP/P0 determination.

16. The apparatus of claim 15, wherein the apparatus receives a desired reverse-link ΔP/P0 determination from at least one second UE, the desired reverse-link ΔP/P0 determination being determined by the at least one second UE based on a respective ΔP/P0 determination provided to it in a forward-link communication.

17. An integrated circuit incorporating the apparatus of claim 1.

18. An apparatus for controlling a data rate of at least a first User Equipment (UE) in a multi-user communication system, the apparatus comprising:
a processing circuit coupled to a memory, wherein the processing circuit is configured to:
determine a channel estimate for a plurality of different reverse-link signals to produce a plurality of channel estimates;
determine a first signal-to-noise ratio (SNR) for the first UE using the plurality of channel estimates, and
determine a first reverse-link data rate using the first SNR based on a traffic channel power spectral density (PSD) to pilot power ratio (ΔP/P0) of each reverse link channel, wherein the ΔP is based on a power amplifier headroom or a path differential between a serving cell and other cells.

19. The apparatus of claim 18, wherein the processor uses a minimum mean square error (MMSE) technique for determining SNRs.

20. The apparatus of claim 18, wherein the processor uses a minimum mean square error-successive interference cancellation (MMSE-SIC) technique for determining SNRs.

21. The apparatus of claim 18, wherein the processing circuit is configured to calculate a total power of each reverse-link signal.

22. An apparatus for controlling a data rate of at least a first UE in a multi-user communication system, the apparatus comprising:
a channel estimation means for determining a channel estimate for a plurality of different reverse-link signals to produce a plurality of channel estimates;
a demodulation means for determining a first signal-to-noise ratio (SNR) for the first UE using the plurality of channel estimates; and
a determining means for determining a first reverse-link data rate using the first SNR based on a traffic channel power spectral density (PSD) to pilot power ratio (ΔP/P0) of each reverse link channel, wherein the ΔP is based on a power amplifier headroom or a path differential between a serving cell and other cells.

23. The apparatus of claim 22, wherein the first UE and apparatus communicate in the reverse-link using an OFDM protocol.

24. The apparatus of claim 23, wherein the demodulation means uses a minimum mean square error (MMSE) process.

25. The apparatus of claim 23, wherein the demodulation means uses a minimum mean square error-successive interference cancellation (MMSE-SIC) process.

26. The apparatus of claim 25, wherein the apparatus calculates the power of each reverse-link stream to determine a cancellation order for MMSE-SIC calculation.

27. A method for controlling a data rate of at least a first UE in a multi-user communication system, the method comprising:
determining a channel estimate for a plurality of different reverse-link signals to produce a plurality of channel estimates;
determining a first signal-to-noise ratio (SNR) for the first UE using the plurality of channel estimates; and
determining a first reverse-link data rate using the first SNR based on a traffic channel power spectral density (PSD) to pilot power ratio (ΔP/P0) of each reverse link channel, wherein the ΔP is based on a power amplifier headroom or a path differential between a serving cell and other cells.

28. The method of claim 24, further comprising:
scheduling reverse-link communication with the first UE using the first reverse-link data rate.

29. The method of claim 27, wherein the first UE communicates in the reverse-link using an OFDM protocol.

30. The method of claim 29, wherein the step of determining a channel estimate includes using a minimum mean square error (MMSE) technique for determining SNRs.

31. The method of claim 29, wherein the step of determining a channel estimate includes using a minimum mean square error—successive interference cancellation (MMSE-SIC) technique for determining SNRs.

32. The method of claim 31, further comprising calculating a power of each reverse-link signal to determine a cancellation order for MMSE-SIC calculation.

33. A computer-readable memory device containing a plurality of computer-based instructions, the computer-based memory comprising:
first code for determining a channel estimate for a plurality of different reverse-link signals to produce a plurality of channel estimates;
second code for determining a first signal-to-noise ratio (SNR) for the first UE using the plurality of channel estimates; and
third code for determining a first reverse-link data rate using the first SNR based on a traffic channel power spectral density (PSD) to pilot power ratio ($\Delta P/P0$) of each reverse link channel, wherein the $\Delta P$ is based on a power amplifier headroom or a path differential between a serving cell and other cells.

34. The computer-readable memory device of claim 33, wherein the first code is configured to estimate channels for OFDM signals.

35. The computer-readable memory device of claim 34, wherein the first code is also configured to determine SNRs using a minimum mean square error—successive interference cancellation (MMSE-SIC) algorithm.

36. An apparatus for scheduling data rates for a plurality of UEs, comprising:
means for power controlling respective reference signals from the UEs; and
means for determining a reverse-link data rate for the respective UEs using a signal-to-noise ratio (SNR) based on a traffic channel power spectral density (PSD) to pilot power ratio ($\Delta P/P0$) of each reverse link channel, wherein the $\Delta P$ is based on a power amplifier headroom or a path differential between a serving cell and other cells.

37. The apparatus of claim 36, wherein the pilot information includes channel quality information.

38. The apparatus of claim 36, further comprising a scheduling means for scheduling reverse-link data transmissions of the UEs.

* * * * *